US009720968B2

(12) United States Patent
Li et al.

(10) Patent No.: US 9,720,968 B2
(45) Date of Patent: *Aug. 1, 2017

(54) RUNTIME OPTIMIZATION FOR MULTI-INDEX ACCESS

(71) Applicant: International Business Machines Corporation, Armonk, NY (US)

(72) Inventors: Shuo Li, Beijing (CN); Ping Liang, Beijing (CN); Ke Wei Wei, Beijing (CN); Xin Ying Yang, Beijing (CN); Chen Xin Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,462

(22) Filed: Sep. 8, 2016

(65) Prior Publication Data

US 2017/0177669 A1    Jun. 22, 2017

Related U.S. Application Data

(63) Continuation of application No. 15/045,522, filed on Feb. 17, 2016, now Pat. No. 9,495,419, which is a
(Continued)

(51) Int. Cl.
*G06F 17/30* (2006.01)

(52) U.S. Cl.
CPC .. *G06F 17/30474* (2013.01); *G06F 17/30463* (2013.01)

(58) Field of Classification Search
CPC ........ G06F 17/30474; G06F 17/30327; G06F 17/30471; G06F 17/30463; G06F 17/30469
See application file for complete search history.

(56) References Cited

U.S. PATENT DOCUMENTS 5,664,171 A * 9/1997 Agrawal ........... G06F 17/30469
5,875,445 A * 2/1999 Antonshenkov .. G06F 17/30327
(Continued)

OTHER PUBLICATIONS

Li et al., "Runtime Optimization for Multi-Index Access", U.S. Appl. No. 14/970,599, filed Dec. 16, 2015.
(Continued)

*Primary Examiner* — James E Richardson
(74) *Attorney, Agent, or Firm* — Isaac J. Gooshaw

(57) ABSTRACT

Optimization of a multi-index database access at runtime. A processor receives a query. A processor determines a plan and a record identifier (RID) results threshold for the plan, wherein the plan includes an access to the index. A processor determines a static risk threshold, a static risk for the access, and whether the static risk exceeds the static risk threshold. Responsive to the static risk exceeding the static risk threshold, a processor determines a risk bound for the access, and links the access to the risk bound. A processor accesses the index with the key. Responsive to the access being linked to a risk bound, a processor determines a dynamic risk for the access. A processor receives one or more RID results during the execution of the plan. A processor aborts the execution of the plan if a quantity of the RID results is less than the RID results threshold.

1 Claim, 6 Drawing Sheets

Related U.S. Application Data continuation of application No. 14/970,599, filed on Dec. 16, 2015.

(56) References Cited

U.S. PATENT DOCUMENTS

| | | | |
|---|---|---|---|
| 5,956,706 A * | 9/1999 | Carey | G06F 17/3041 |
| 6,330,552 B1 * | 12/2001 | Farrar | G06Q 10/04 705/400 |
| 6,353,818 B1 * | 3/2002 | Carino, Jr. | G06F 17/30463 |
| 6,865,567 B1 * | 3/2005 | Oommen | G06F 17/30463 |
| 7,725,448 B2 | 5/2010 | Beavin et al. | |
| 8,200,645 B2 | 6/2012 | Bhattacharjee et al. | |
| 8,359,316 B2 | 1/2013 | Franke et al. | |
| 8,515,927 B2 | 8/2013 | Bailey, Jr. et al. | |
| 8,676,865 B2 | 3/2014 | Han et al. | |
| 8,862,566 B2 | 10/2014 | Leitner et al. | |
| 9,495,419 B1 | 11/2016 | Li et al. | |
| 2007/0130107 A1 * | 6/2007 | Waas | G06F 17/30312 |
| 2008/0183663 A1 | 7/2008 | Day et al. | |
| 2009/0030874 A1 * | 1/2009 | Das | G06F 17/30312 |
| 2009/0083292 A1 * | 3/2009 | Bhattacharjee | G06F 17/30595 |
| 2009/0094191 A1 * | 4/2009 | Chaudhuri | G06F 17/30463 |
| 2010/0191720 A1 * | 7/2010 | Al-Omari | G06F 17/30463 707/718 |
| 2011/0010359 A1 * | 1/2011 | Burger | G06F 17/30463 707/718 |
| 2011/0016107 A1 * | 1/2011 | Kuno | G06F 17/30463 707/718 |
| 2012/0072412 A1 * | 3/2012 | Bestgen | G06F 17/30474 707/714 |
| 2012/0203762 A1 * | 8/2012 | Kakarlamudi | G06F 17/30463 707/718 |
| 2013/0304723 A1 * | 11/2013 | Konik | G06F 17/30483 707/718 |

OTHER PUBLICATIONS

Mohan et al; "Single Table Access Using Multiple Indexes: Optimization, Execution, and Concurrency Control Techniques", EDBT '90 Proceedings of the 2nd international conference on extending database technology: Advances in Database Technology, pp. 29-43. 1990.

List of IBM Patents or Parent Applications Treated as Related. Filed Feb. 3, 2017. 2 pages.

"Predicates and access path selection", pp. 1-2, provided on the Search Report dated Sep. 30, 2014.

* cited by examiner

RUNTIME OPTIMIZATION FOR MULTI-INDEX ACCESS

BACKGROUND OF THE INVENTION

The present invention relates generally to the field of databases, and more particularly to database access optimization techniques.

A user queries a database by submitting one or more conditions or constraints that the data sought must meet. The database searches for data, often in tables, that fulfill the constraints and returns the data to a user. A database search can consume a considerable amount of system resources (e.g., CPU cycles, memory, interconnect bandwidth, and disk space) that can depend on a number of things— including the amount of data in the database, the structure of the data, the conditions that the requested data must meet, and the distribution of the requested data in the database. To facilitate access to a database, often one or more indexes into the database is formed. Usually a database index is a table that contains information about a particular column of data in a database table (i.e., a column in a table in the database). The index often contains one entry for each unique value in the column that the index represents. The entry for a unique value contains the address(s) (i.e., record identifier(s) or RIDs) of the information in the row(s) in the database table that contain the unique value. Therefore, an index enables relatively efficient access to the rows of data that contain specific data in a column of a table. Often, more than one index is formed on the same table, one index for each column of interest in the table.

Because a database query can be complex and can consume significant computational resources, a data base query optimizer is usually invoked to generate a query plan that attempts to utilize resources efficiently and decrease execution time. In general, such a query plan partitions a query into a sequence of database accesses in an attempt to minimize the total number of rows that must be accessed and processed to fulfill the conditions and constraints on the data requested by the query. For example, it is efficient to execute that part of a query first that effects the greatest decrease in the search space for subsequent parts of the query.

SUMMARY

Embodiments of the present invention provide a computer program product to optimize a multi-index database access at runtime. A processor receives a query that includes at least one predicate that is associated with a key to an index to a table, wherein the index is implemented in a B-tree data structure. A processor determines a plan to satisfy the query and a record identifier (RID) results threshold for the plan, wherein i) the plan includes an access to the index, and ii) the RID results threshold is adaptively changed during execution of the plan based, at least in part, on an estimation of the size of the table. A processor determines a static risk threshold. A processor determines a static risk for the access based, at least in part, on analyzing statistics on the index, and wherein the statistics on the index includes an estimate of at least one of i) a cardinality of the index, ii) a number of entries in the index, and iii) a greatest number of a same value in the index. Responsive to the static risk for the access exceeding the static risk threshold, a processor determines a risk bound for the access based, at least in part, on analyzing statistics on the index, wherein the statistics on the index include an estimate of at least one of i) a cardinality of the index, ii) a number of entries in the index, and iii) a greatest number of a same value in the index. Responsive to the static risk for the access exceeding the static risk threshold, a processor links the access to the risk bound. A processor executes the access to the index with the key. Responsive to the access being linked to the risk bound, a processor determines a dynamic risk for the access during execution of the access, wherein the dynamic risk for the access is based, at least in part, on an estimate of a fraction of a number of entries for the key relative to a total number of entries in one or more non-leaf nodes in the index. Responsive to the access being linked to a risk bound and the dynamic risk of the access exceeds the risk bound, a processor aborts the access during the execution of the plan, wherein aborting the access during the execution plan includes, but is not limited to, performing a table scan of the table. A processor receives one or more RID results during the execution of the plan. Responsive to the one or more RID results being less than the RID results threshold, a processor aborts the execution of the plan.

DETAILED DESCRIPTION

Figure 1:
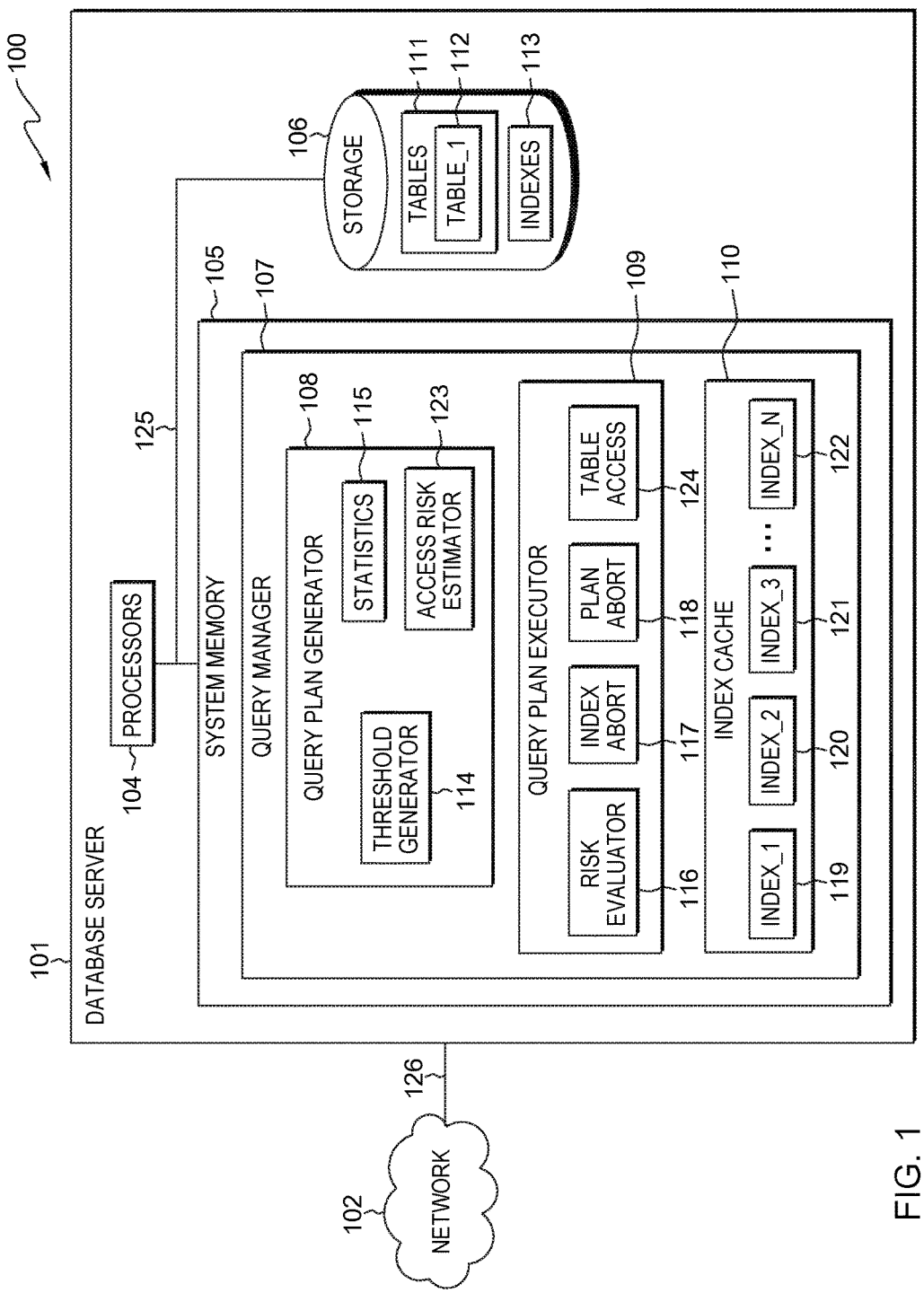
FIG. 1 depicts a block diagram of a database system, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A data base management system (DBMS) user specifies the data to be retrieved via a query, generally in a high level language, which contains predicates to identify which records are to be retrieved from a single stored table or from the result of joining multiple tables. The optimizer component of the DBMS determines an execution strategy for the query, determining in what order and how the tables should be accessed. A common access method used with DBMS s is an index. An index for a table is a data structure that contains a subset of the data contained in the table, and therefore can be accessed faster than the table. If multiple indexes contain overlapping information that is pertinent to a query, a query planner typically plans a sequence of accesses to some or all of the indexes that most efficiently satisfies the query. Typically, an index is implemented in a data structure that is a variant of a B-tree data structure (i.e., a balanced tree data structure) and the key of an index is the set of fields (i.e., the names of the columns) of the table over which the index is defined. The key is used to search the index for information that is associated with the key.

A B-tree data structure is an inverted (i.e., upside down) tree-like structure of connected nodes. Leaf nodes are at the bottom of the tree and contain the data of the tree and a single access point (i.e., the root node) is at the top of the tree. A B-tree access consists of accessing the root node with a key value. The root node directs the access to one of two or more descendent nodes (children or non-leaf nodes) that are each a root to a sub-tree. The sub-tree that the access is directed to contains a leaf node that contains a key with the key value. The process continues with each non-leaf node directing the access to a decedent non-leaf node until a leaf node is reached that contains the key value and the data that is associated with the key value.

The value of a key is what is searched for in an index and, when found, has data associated with it (e.g., the address of a database record). A key is considered to be a simple key if it consists of only one field of the table. A key is considered to be a complex key if it is constructed by concatenating multiple fields of the table. Each entry in the index leaf page consists of a key value followed by a RID (record identifier), where the RID is the record identifier of the record containing that key value. An RID is a pointer to the physical position of the record in a database. In general, most of the tables in a database will have multiple indexes defined on them.

An index is an eligible index for use in answering a given query if its key includes at least one of the fields referenced in the predicates of the query. If a predicate is going to be applied via any indexes at all, then it is possible that there are multiple eligible indexes for applying that predicate, but only one of them needs to be chosen. One of the challenges in query optimization is determining how many and which of the eligible indexes to use. In some embodiments and scenarios, if a complete table scan is to be avoided, depending on the predicates, certain eligible indexes have to be accessed in order to yield the correct result. As such, the selectivity of a predicate is the fraction of records in the table that satisfy the predicate.

When multiple predicates are specified in a query, the predicates are linked together by the Boolean operators AND/OR, Those predicates which are linked by ANDs are called conjunctive predicates. Those predicates which are linked by ORs are called disjunctive predicates. In some systems, the predicates are converted to the Conjunctive Normal Form (CNF). A CNF expression consists of a set of predicates (called Boolean factors or conjuncts) connected by ANDs. Each conjunct may be a non-decomposable predicate (simple predicate) or a set of simple predicates connected by ORs. Therefore, a CNF set of predicates is a conjunct of disjuncts. In exemplary embodiments, it is not required that the predicates be converted to CNF.

As an example, in one scenario, an SQL query that finds those employees who have qualified for retirement (age older than 65 or more than 30 years of service) appears as follows: SELECT (name), FROM (EMPLOYEE), WHERE (AGE >65) OR (SERVICE >30). However, if the DBMS is not capable of using more than one index for a table, and a single index with a complex key that included both AGE and SERVICE does not exist, then the only way to find the answer to the query is to scan every record of the EMPLOYEE table and to check the predicates against each record. However, this may turn out to be an extremely inefficient execution plan. In contrast, if two indexes exist, where one index's key includes AGE and the other index's key includes SERVICE, then the first index can be used to find those employees with AGE >65 and the second index can be used to find those employees with SERVICE >30. The solution provided by an exemplary embodiment, which yields the desired results for the SQL query, includes the union of these two partial answer sets, the development of which requires significantly fewer table accesses than if the entire table had been accessed.

In general, most tables in a database will have multiple indexes defined on them. An index is an eligible index for use in answering a given query if its key includes at least one of the fields referenced in the predicates of the query. A task for a query optimizer is to determine how many and which of the applicable indexes to use to most efficiently satisfy a query. A query optimizer plans a sequence of accesses to tables and indexes in a database in an attempt to efficiently narrow the number of results (i.e., the number of RIDs) from the accesses. Embodiments of the present invention recognize that it is advantageous to be able to estimate whether or not an access to an index will be efficient and, if an access occurs, to be able to monitor and terminate an access if it becomes likely that the access will not be cost-effective or will not narrow the result set. For example, in the case of conjunctive predicates (i.e., those predicates which are linked by ANDs), if it is likely that the intersection of the result set of an index access with the existing result set will probably not filter out many RIDs, then the index access should not be performed or if the access has been initiated, it should be terminated. In an embodiment of the present invention, a database access is terminated if the result set has sufficiently few RIDs in it.

A risk associated with an index access is the potential that the index access has to consume computing time and resources with little or no resultant benefit to achieving the goal of the query. As used herein, efficiency refers to the minimal usage of computing time and resources to achieve a goal of the query. As such, an increase in efficiency refers to a decrease in the usage of one or both of computing time and resources. Embodiments of the present invention increase the efficiency of a query i) by estimating the risk of each index access that is considered for inclusion in a query plan during the generation of the query plan and ii) by monitoring the risk associated with certain index accesses during execution of the plan. In some embodiments and scenarios, some index accesses are incorporated into a plan (ruled-in) during the generation of the query plan and some index accesses are not included in the plan (ruled-out). In some scenarios, certain embodiments of the present invention can rule-out some accesses that are determined to be too risky (e.g. above a threshold), can rule-in some accesses that are determined to have little risk (e.g. below a threshold), and can rule-in some accesses that are determined to be potentially useful but are somewhat risky based on statistics that were previously accumulated on the table accessed. In some embodiments and scenarios, ruled-in accesses that are somewhat risky are monitored during their executions. In some such embodiments and scenarios, a potentially useful but somewhat risky index access is assigned a risk limit when it is incorporated into the plan, and the index access is terminated during its execution if the risk limit is exceeded by a current risk. In an embodiment, the current risk that is associated with an index access that is in progress is derived from information in the non-leaf nodes of the B-tree data structure of the index being accessed.

FIG. 1 depicts database system 100 that, in some scenarios and embodiments, contains database server 101 that is connected to network 102 via connection 126. In some scenarios and embodiments, database server 101 contains processors 104 that is connected to system memory 105 and storage 106 via connection 125. In an embodiment, system memory 105 contains query manager 107, which plans and executes queries submitted to database server 101. In an embodiment, query manager 107 includes query plan generator 108, query plan executor 109, and index cache 110. Query plan generator 108 creates and optimizes a query plan for a query, which includes a time-sequence of planned table and index accesses that are likely to satisfy the query in an efficient manner. Query plan generator 108 also identifies certain index accesses that should be monitored for excessive risk during their access. Query plan executor 109 executes a query plan that is generated by query plan generator 108 and monitors the dynamic risk (i.e., a risk that is determined while a query plan is executed) of certain high risk index accesses (that are identified by query plan generator 108 in a query plan that it generates) during the monitored access. In an embodiment, index cache 110 holds indexes that have been recently accessed by query plan executor 109.

In an embodiment, query plan generator 108 includes threshold generator 114, statistics 115, and access risk estimator 123. In an embodiment, query plan executor 109 includes risk evaluator 116, index abort 117, plan abort 118, and table access 124. In an embodiment, index cache 110 includes index_1 119, index_2 120, and index_3 121. In an embodiment, storage 106 is a persistent storage for database server 101 that includes tables 111 and indexes 113. In an embodiment, tables 111 includes table_1 112.

Figure 2:
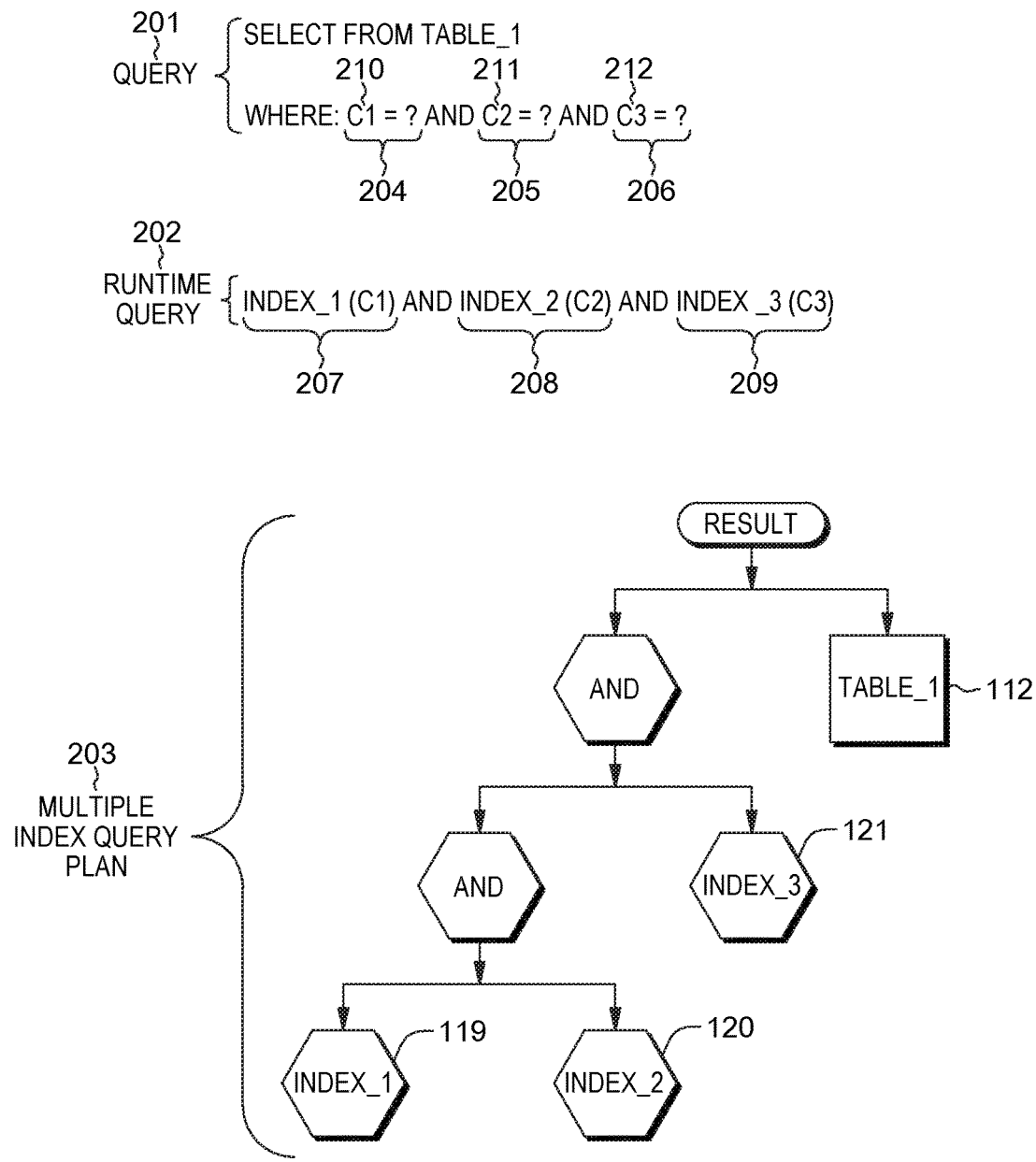
FIG. 2 depicts a block diagram of a database query, a runtime query, and a multiple index query plan, in accordance with an embodiment of the present invention.

FIG. 2 shows example query 201, runtime query 202, and multiple index query plan 203. Query 201 comprises three conjunctive predicates (predicate 204, predicate 205, and predicate 206) that database server 101 must fulfill. Each of the three predicates involves a condition that is imposed on a field (i.e., a column of data) in table_1 119. Predicate 204 imposes a condition C1 210 on the data in column 1 in table_1 119, predicate 205 imposes a condition C2 211 on the data in column 2 in table_1 119, and predicate 206 imposes a condition C3 212 on the data in column 3 in table_1 119. Query plan generator 108 analyzes query 201 and determines that predicate 204 is associated with index_1 119 (an index on column 1 in table_1 112), that predicate 205 is associated with index_2 120 (an index on column 2 in table_1 112), and that predicate 206 is associated with index_3 121 (an index on column 3 in table_1 112). In some scenarios and embodiments, query plan generator 108 evaluates accesses to index_1 119, index_2 120, and index_3 121 for inclusion into a query plan because index_1 119, index_2 120, and index_3 are associated with predicate 204, predicate 205, and predicate 206 respectively in query 201. Query plan generator 108 evaluates a risk (i.e., a static risk) to access index_1 119, index_2 120, and index_3 121 before the accesses are included in multiple index query plan 203. In an embodiment, query plan generator converts query 201 into runtime query 202 that includes information on indexes to be accessed to satisfy query 201. In an embodiment, runtime query 202 includes index access 207, index access 208, and index access 209. In some scenarios and embodiments, query plan generator 108 determines a RID results threshold for multiple index query plan 203. In an embodiment, if a plurality of RID results is less than the RID results threshold during execution of multiple index query plan 203, the execution of query plan 203 is aborted by plan abort 118. The execution of query plan 203 is aborted by plan abort 118 because a result set has been sufficiently narrowed and further accesses are unlikely to further narrow the result set.

In some scenarios and embodiments, access risk estimator 123, in query plan generator 108, estimates the static risk that is associated with an access to each index to table_1 112 that can fulfill a predicate in query 201. Access risk estimator 123 estimates a risk (i.e., a static risk) associated with an access to each of the indexes (index_1 119, index_2 120, and index_3 121) that query plan generator 108 evaluates for inclusion in a query plan to satisfy query 201. In an embodiment, access risk estimator 123 accesses statistics 115 to analyze statistics on each of the indexes to determine a risk associated with an access to an index. In an embodiment, statistics 115 includes, for index_1 119, index_2 120, and index_3 121, i) a cardinality of the index, ii) a number of entries in the index, and iii) a greatest number of a same value in the index. In an embodiment, the static risk associated with an access to index_1 119 is a value of the quantity: (High_Risk_Bias−Low_Risk_Bias).

In an embodiment, values in an index can be duplicated, that is, there can be multiple rows in an index for the same value. A value duplication count for a value is the number of times that the value is duplicated in an index. In some such embodiments, there is a value duplication count for each unique value in an index and the greatest duplication count is the largest duplication count among all the duplication counts for all the values in an index. In an embodiment, High_Risk_Bias is the greatest duplication count among the values in index_1 119 divided by the number of rows in index_1 119. High_Risk_Bias is a measure of the probability that a large number of results is received from an access to index_1 119. The greater the value of High_Risk_Bias, the greater the chance that an access to index_1 119 will return a large number of rows (i.e., RIDs). An access that returns a large number of rows often does not significantly decrease the number of results that fulfill a query and often incurs significant computational time and resources.

In an embodiment, the cardinality of index_1 119 is the number of unique values in index_1 119. In an embodiment, Low_Risk_Bias is the inverse of the cardinality of index_1 119 (i.e., one divided by the cardinality). For example, if index_ 119 contained two unique values, the cardinality of index_1 119 would be two and the Low_Risk_Bias would be 0.5. Low_Risk_Bias is a measure of the variety of values in index_1 119. A larger variety of values in an index increases the probability that a search for a given value will return fewer results (i.e., fewer rows will have that particular value).

Increasing values of High_Risk_Bias reflect an increasing probability that an access to index_1 119 will return a large number of results (i.e., higher risk), which require a commensurate expenditure of computational resources to process. Increasing values of Low_Risk_Bias reflect an increasing probability that an access to index_1 119 will return few results (i.e., lower risk). For a given index, for example, index_1 119, statistics 115 holds the greatest duplication count in index_1 119, the number of rows in index_1 119, and the cardinality of index_1 119. Access risk estimator 123 accesses these values (i.e., the greatest duplication count in index_1 119, the number of rows in index_1 119, and the cardinality of index_1 119) from statistics 115 when access risk estimator 123 estimates the static risk of an access to index_1 119. Those skilled in the art realize that there are many ways to define a risk and evaluate a risk of an access to an index.

In some scenarios and embodiments, threshold generator 114 generates a threshold (i.e., a static risk threshold) for a static risk for an access of index_1 119 and access risk estimator 123 generates a static risk for an access to index_1 119. If the static risk is beneath the static risk threshold, query plan generator 108 identifies the risk for the access to index_1 119 as low risk. In an embodiment, an access that is identified as low risk is not monitored during the execution of the access. If the static risk is equal to or above the static risk threshold, query plan generator 108 identifies the risk for the access to index_1 119 as high risk when the access is inserted into multiple index query plan 203.

If an access to index_1 119 is identified as high risk (i.e., an access that is monitored for dynamic risk during its execution), threshold generator 114 determines a risk bound for the high risk access to index_1 119 and the risk bound is linked (i.e., associated) with the access to index_119 in a query plan. In an embodiment, an information on index_1 119 in statistics 115 at a time t is based on information acquired on accesses to index_119 prior to time t, and therefore the information in statistics 115 may not be accurate at a time that the information is accessed. Embodiments of the present invention recognize that a risk (i.e., the static risk) for an access to an index that is based on information in statistics 115 may not be accurate (because the information in statistics 115 may not be current), and therefore embodiments of the present invention monitor a risk (i.e., the dynamic risk) of a high static risk access to an index during the access (i.e., during runtime), when information about the risk to the access of the index is current.

FIG. 2 shows an example runtime query, runtime query 202, that query plan generator 108 generates from query 201. In an embodiment, runtime query 202 is comprised of the conjunctive AND of the results (i.e., the RIDs) from three index accesses: results from an access to index_1 119 with condition C1 210 in predicate 204, results from an access to index_2 120 with condition C2 211 in predicate 205, and results from an access to index_3 121 with condition C3 212 in predicate 206. After an estimated static risk for each access is generated by access risk estimator 123, query plan generator 108 generates multiple index query plan 203. Query plan executor 109 executes multiple index query plan 203.

If the access to index_1 119 is high risk (i.e., a risk bound has been generated for the access), risk evaluator 116 in query plan executor evaluates a dynamic risk of the access to index_1 119 during the execution the access to index_1 119 by query plan executor 109. If the dynamic risk exceeds the risk bound that is associated with the access to index_1 119, index abort 117 aborts the access to index_1 119. In an embodiment, during an access to index_119, risk evaluator 116 analyzes information contained in the non-leaf nodes of the B-tree data structure that implements index_1 119 to determine the dynamic risk of the access to index_1 119.

Figure 3:
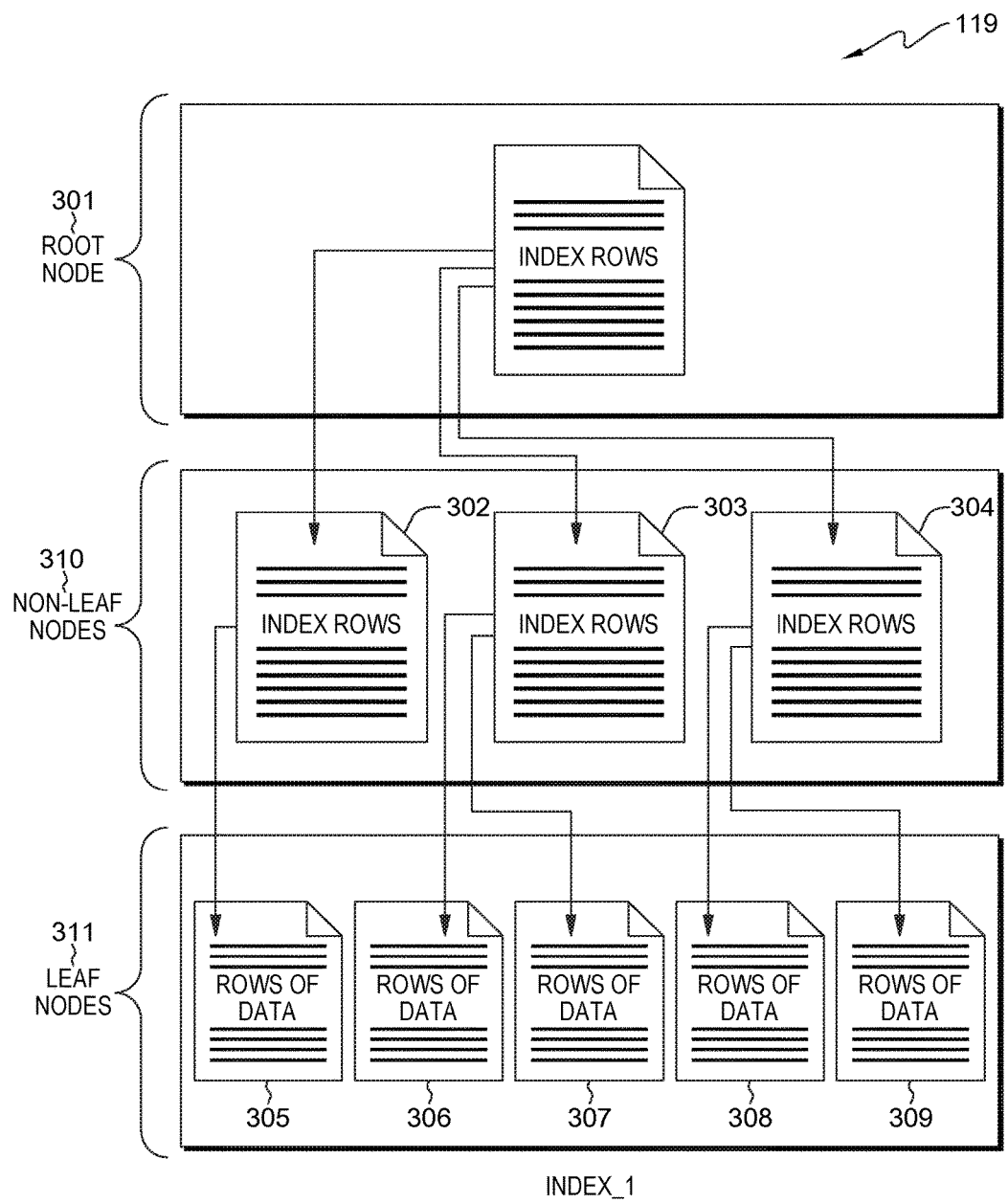
FIG. 3 depicts a block diagram of an index that is included in the multiple index query plan that is depicted in FIG. 2, in accordance with an embodiment of the present invention.

FIG. 3 shows the details of index_119 (i.e., the details of the B-tree data structure that, in an embodiment, implements index_1 119). Index_1 119 is accessed by an access to root node 301 of index_1 119. Depending on the information being sought in the access, information in root node 301 directs the access to one or more of non-leaf nodes 310, which is comprised of non-leaf node 302, non-leaf node 303, and non-leaf node 304. In an embodiment, non-leaf nodes 310 direct the access to leaf nodes 311. In an embodiment, leaf nodes 311 consists of leaf node 305, leaf node 306, leaf node 307, leaf node 308 and leaf node 309. Non-leaf nodes 310 are the descendants of root node 301 in index_1 119. In an embodiment, non-leaf nodes 310 are accessed by query plan executor 109 during an access of index_1 119 by query plan executor 109. In an embodiment, non-leaf nodes 310 contain a current information on the contents of index_1 119 that is evaluated by risk evaluator 116 to determine a dynamic risk of the access to index_1 119, if the access to index_1 119 is a high risk access.

In an embodiment, the current information in non-leaf nodes 310 (used to determine the dynamic risk) includes information that enables an estimate of a fraction of a number of entries for the key in the index relative to a total number of entries in the index to be determined by query plan executer 109. In an embodiment, the dynamic risk is the fraction of a number of entries for the key in the index relative to a total number of entries in the index. If the dynamic risk exceeds the risk bound for the access to index_1 119, index abort 117 aborts the access to index_1 119. In an embodiment, if index abort 117 aborts an access to an index of a table, table access 124 performs a table scan of the table. For example, if index abort 117 aborts an access to index_1 119, table access 124 performs a table scan of table_1 112. In an embodiment, a table scan is an access to all the columns in a database table rather than an access to an index to the table, which contains information in only one column of the table.

In some scenarios and embodiments, an access to index_2 120, and an access to index_3 121 are processed by query plan generator 108 and processed by query plan executor 116 to fulfill query 201, in a substantially similar fashion as an access to index_1 119 was processed to fulfill query 201.

Figure 4:
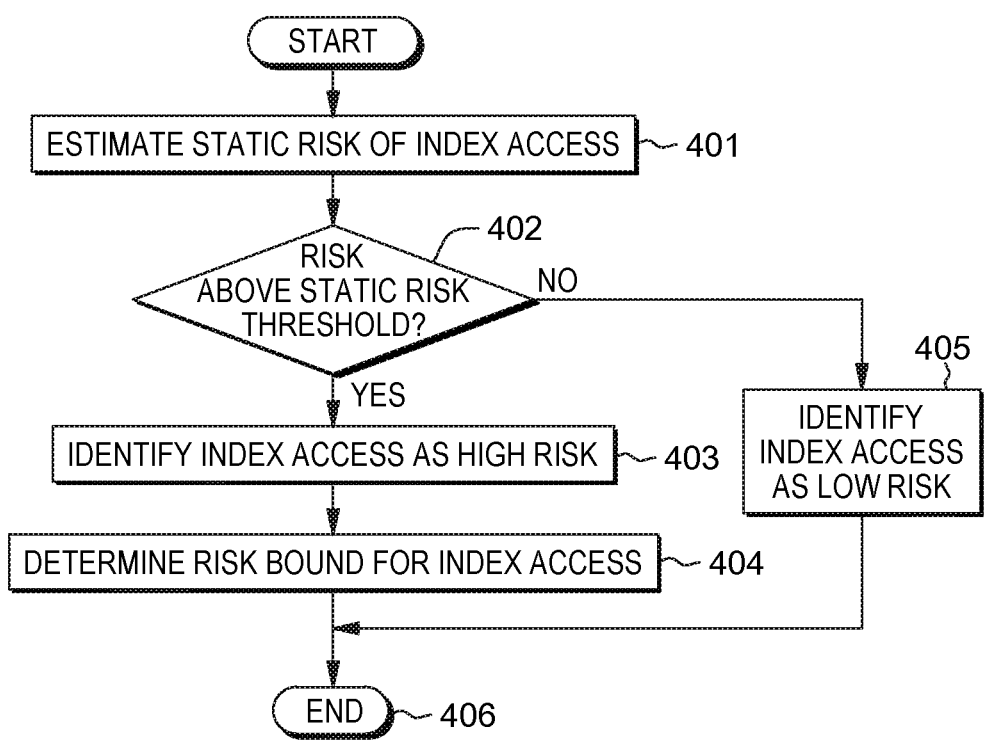
FIG. 4 is a flow chart that depicts the operation of the access risk estimator that is depicted in FIG. 1, in accordance with an embodiment of the present invention.

FIG. 4 is a flowchart that depicts the operation of access risk estimator 123 in an embodiment. In an embodiment, access risk estimator 123 generates a static risk for an access to index_1 119. Access risk estimator 123 receives statistics from statistics 115 and receives a static risk threshold from generator 114. Access risk estimator generates the static risk for an access of index_1 119 from the statistics (step 401). Access risk estimator 123 determines whether the static risk is above the static risk threshold (decision step 402). If the static risk is not above the threshold (decision step 402, NO branch), then access risk estimator 123 identifies an access to index_1 119 as low risk (step 405) and the process ends (step 406). If the static risk is above the threshold (decision step 402, YES branch), then access risk estimator 123 identifies an access to index_1 119 as high risk (step 403). Access risk estimator 123 determines a risk bound for the access to index_1 119 (step 404) and the process ends (step 406).

Figure 5:
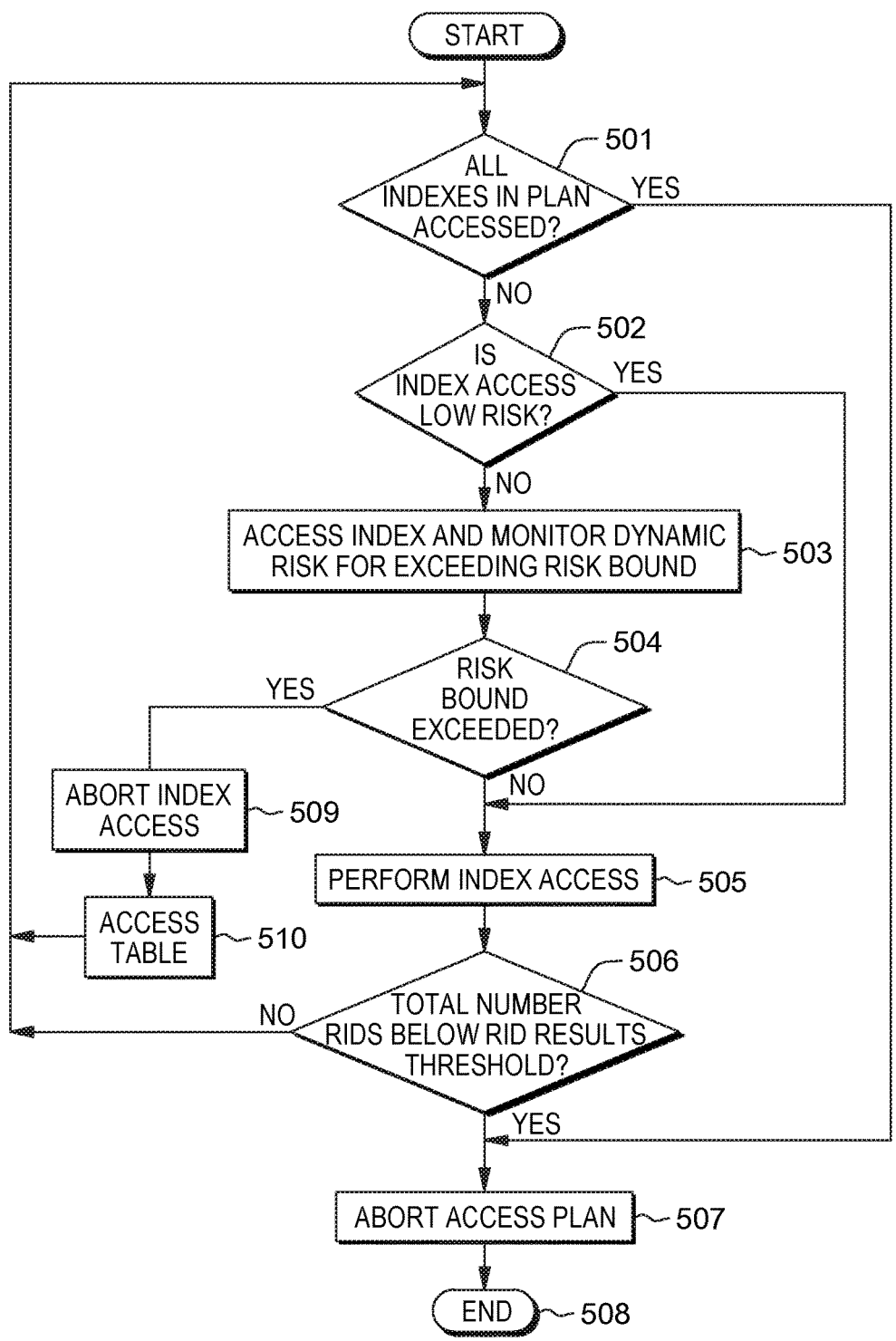
FIG. 5 is a flow chart that depicts the operation of the query plan executor that is depicted in FIG. 1, in accordance with an embodiment of the present invention.

FIG. 5 is a flowchart that depicts the operation of query plan executor 109 in an embodiment. In an embodiment, query plan estimator 109 determines whether all the indexes in multiple index query plan 203 have been accessed (decision step 501). If all the indexes in multiple index query plan 203 have not been accessed (decision step 501, NO branch), then query plan executor 109 determines if the next index access to be executed is a low risk access (decision step 502). If the next index access to be executed is not a low risk access (decision step 502, NO branch), then query plan executor 109 accesses the index (the access is a high risk access) and processes the information in the non-leaf nodes of the access to determine a dynamic risk of the access (step 503). Query plan executor 109 determines whether the dynamic risk of the access exceeds the risk bound associated with the access (decision step 504). If the dynamic risk of the access does not exceed the risk bound associated with the access (decision step 504, NO branch), then query plan executor 109 completes the access (step 505). Query plan executor 109 determines if the number of RID results returned from an execution of multiple index query plan 203 is below a RID results threshold (decision step 506). If the total number of RID results returned from an execution of multiple index query plan 203 is below a RID results threshold (decision step 506, YES branch), then query plan executor 109 aborts further execution of multiple index query plan 203 (step 507) and the process ends (step 508).

If the dynamic risk of the access exceeds the risk bound associated with the access (decision step 504, YES branch), then query plan executor 109 aborts the access of the index (step 509). Query plan executor 109 accesses the table associated with the index (step 510) and determines whether all indexes in multiple index query plan 203 have been accessed (decision step 501).

If the next index access to be executed is a low risk access (decision step 502, YES branch), then query plan executor 109 accesses the index (step 505). Query plan executor 109 determines whether the number of RID results returned from an execution of multiple index query plan 203 is below a RID results threshold (decision step 506). If the total number of RID results returned from an execution of multiple index query plan 203 is below a RID results threshold (decision step 506, YES branch), then query plan executor 109 aborts further execution of multiple index query plan 203 (step 507) and the process ends (step 508).

If the total number of RID results returned from an execution of multiple index query plan 203 is below a RID results threshold (decision step 506, NO branch), then query plan executor 109 determines if all indexes in multiple index query plan 203 have been accessed (decision step 501).

If all the indexes in multiple index query plan 203 have been accessed (decision step 501, YES branch), then query plan executor 109 aborts multiple index query plan 203 (step 507) and the process ends (step508).

Figure 6:
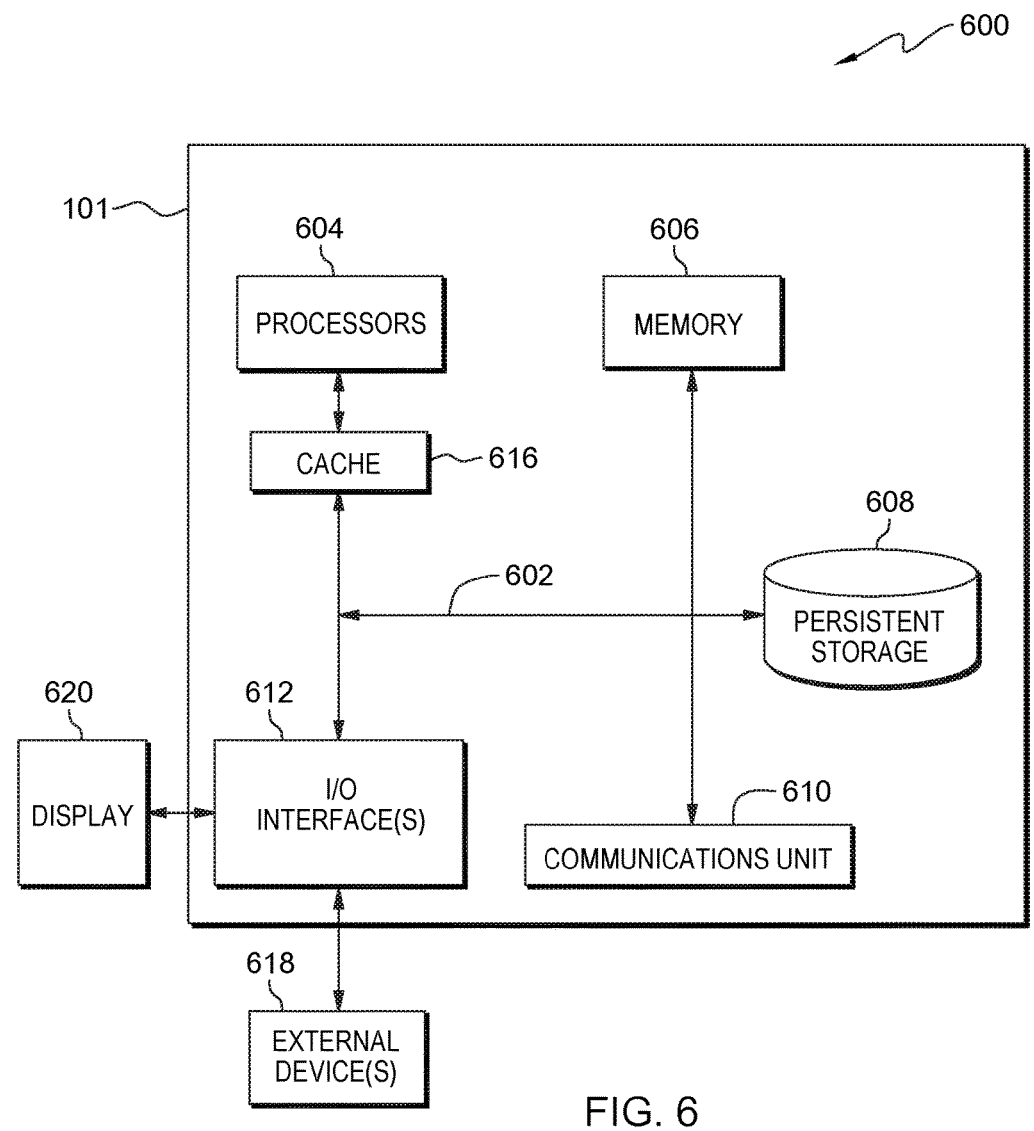
FIG. 6 depicts a block diagram of a computer system that incorporates the database server depicted in FIG. 1, in accordance with an embodiment of the present invention.

FIG. 6 depicts computer system 600 that is an example computer system that incorporates database server 101, a component of database system 100 that includes processors 104, memory system 105, and storage 106. Computer system 600 includes communications fabric 602, which provides communications between computer processor 101, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory. In general, memory 606 can include any suitable volatile or non-volatile computer readable storage media. Cache 616 is a fast memory that enhances the performance of processors 101 by holding recently accessed data and data near accessed data from memory 606.

Program instructions and data used to practice embodiments of the present invention may be stored in persistent storage 608 for execution by one or more of the respective processors 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer program product for optimizing a multi-index database access at runtime, the computer program product comprising:
one or more computer-readable storage media and program instructions stored on the one or more computer-readable storage media, the program instructions comprising:
program instructions to receive a query that includes at least one predicate that is associated with a key to an index to a table, wherein the index is implemented in a B-tree data structure;
program instructions to determine a plan to satisfy the query and a record identifier (RID) results threshold for the plan, wherein i) the plan includes an access to the index, and ii) the RID results threshold is adaptively changed during execution of the plan based, at least in part, on an estimation of the size of the table;
program instructions to determine a static risk threshold;
program instructions to determine a static risk for the access based, at least in part, on analyzing statistics on the index, and wherein the statistics on the index includes an estimate of at least one of i) a cardinality of the index, ii) a number of entries in the index, and iii) a greatest number of a same value in the index;
responsive to the static risk for the access exceeding the static risk threshold, program instructions to determine a risk bound for the access based, at least in part, on analyzing statistics on the index, wherein the statistics on the index include an estimate of at least one of i) a cardinality of the index, ii) a number of entries in the index, and iii) a greatest number of a same value in the index;
responsive to the static risk for the access exceeding the static risk threshold, program instructions to link the access to the risk bound;
program instructions to execute the access to the index with the key;
responsive to the access being linked to the risk bound, program instructions to determine a dynamic risk for the access during execution of the access, wherein the dynamic risk for the access is based, at least in part, on an estimate of a fraction of a number of entries for the key relative to a total number of entries in one or more non-leaf nodes in the index;

responsive to the access being linked to a risk bound and the dynamic risk of the access exceeds the risk bound, program instructions to abort the access during the execution of the plan, wherein aborting the access during the execution plan includes, but is not limited to, performing a table scan of the table;

program instructions to receive one or more RID results during the execution of the plan; and responsive to the one or more RID results being less than the RID results threshold, program instructions to abort the execution of the plan.

* * * * *